UNITED STATES PATENT OFFICE.

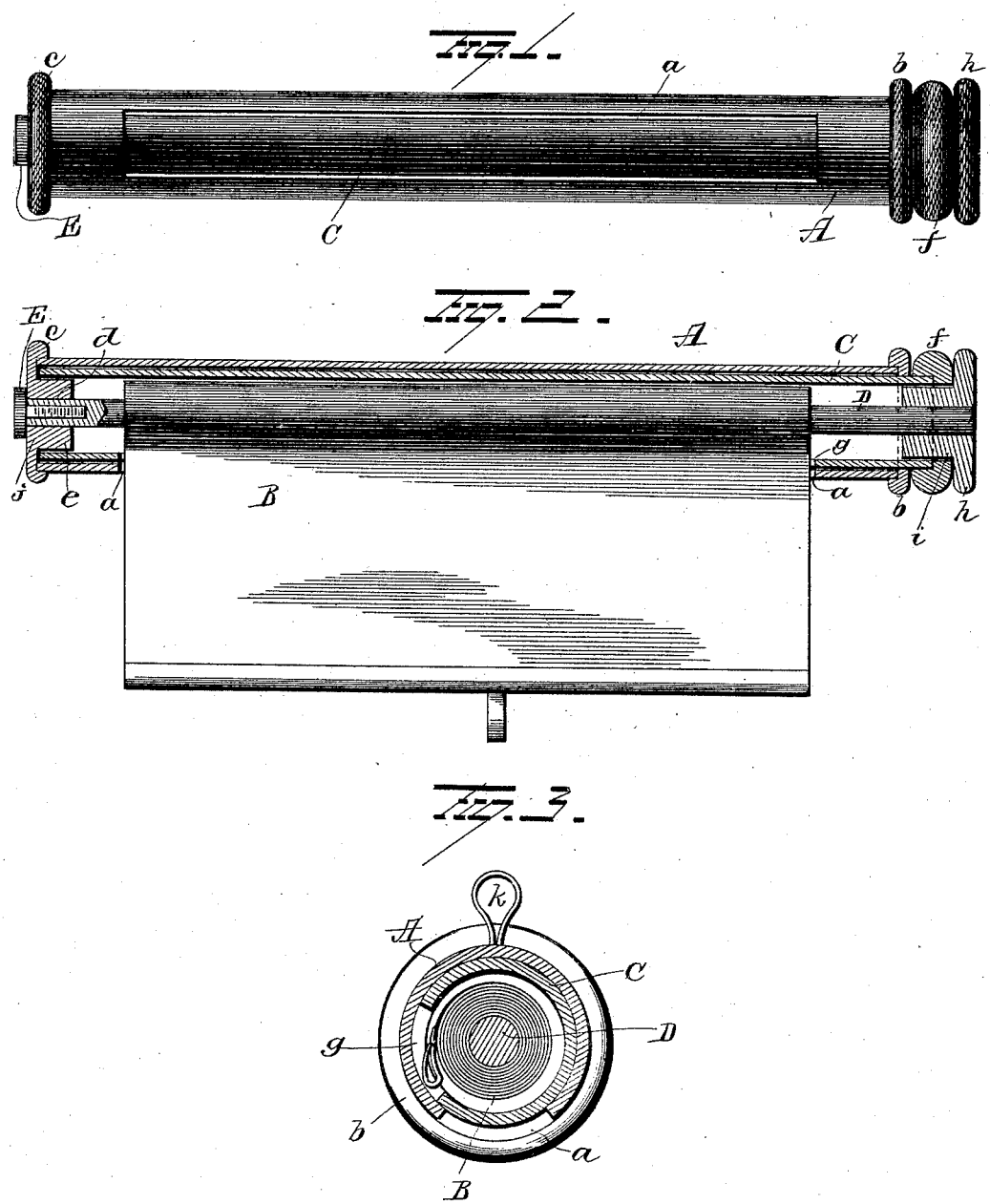

WILLIAM F. SEMPLE, OF MOUNT VERNON, OHIO.

MAP-HOLDER.

SPECIFICATION forming part of Letters Patent No. 446,021, dated February 10, 1891.

Application filed July 23, 1890. Serial No. 359,597. (No model.)

*To all whom it may concern:*

Be it known that I, WILLIAM F. SEMPLE, a citizen of Mount Vernon, in the county of Knox and State of Ohio, have invented certain new and useful Improvements in Map-Holders; and I do hereby declare the following to be a full, clear, and exact description of the invention, such as will enable others skilled in the art to which it appertains to make and use the same.

My invention relates to an improvement in map-holders, its object being to provide an improved holder or cover for maps, charts, &c., by means of which said maps or charts may be completely inclosed and all dirt and dust shall be excluded.

A further object is to so construct a map or chart holder that said map or chart may be easily and quickly withdrawn therefrom for inspection and completely inclosed when not in use.

A further object is to so construct the device that a map or chart may be easily and quickly inserted therein or removed therefrom for repair or other reason.

With these objects in view the invention consists in certain novel features of construction and combinations and arrangements of parts, as hereinafter set forth, and pointed out in the claims.

In the accompanying drawings, Figure 1 is a view of my improved holder closed. Fig. 2 is a central longitudinal sectional view. Fig. 3 is a view in transverse section.

A represents a tube or cylinder made of pasteboard, metal, or other suitable material and of sufficient length to accommodate a map or chart B, said cylinder being provided with an elongated slot or opening $a$ of a length preferably a little more than the width of the map. The tube or cylinder A is provided at one end with a collar $b$ and at the other end with a disk $c$, the latter being provided with a central perforation $d$ and an internally-projecting annular flange $e$.

Located within the tube or cylinder A is a smaller tube or cylinder C, adapted to fit loosely therein and provided at one end with a collar $f$, by means of which to rotate it, as presently explained, the forward end of said tube or cylinder C being adapted to encircle the annular flange $e$. The tube or cylinder C is provided with an elongated opening $g$ of a size equal to the size of the slot or opening $a$ in the tube or cylinder A, and when made to align with said opening $a$ adapted to expose the interior of the holder or the map or chart therein.

Located centrally within the inner tube C and having its bearing at one end in the annular flange $e$ is a revoluble shaft D, to which the map or chart B is secured and adapted to be wound, the opposite end of said shaft being provided with a disk $h$, having a flange $i$, adapted to enter the end of the inner tube and form a bearing for one end of the shaft. The forward end of the shaft extends through the opening in the annular flange $e$ and disk $c$ and is provided with a screw-threaded socket $j$ for the reception of a headed screw E, whereby the parts of the device are connected together. By simply removing the screw E the parts of the device may be separated and the shaft D and map or chart carried thereby removed for repairs or other cause.

Assuming now that the device is closed, as shown in Fig. 1, and it is desired to expose the map contained therein, it is simply necessary to turn the inner tube C by means of its collar or wheel $f$ until the openings $a$ $g$ are in alignment, and then grasp the edge of the map or chart or a loop attached thereto and draw it out. When it is desired to again inclose the map or chart, the disk $h$ is rotated and the map or chart will be wound upon the shaft D. The inner tube is then turned to close the opening in the device. The holder may be provided with a loop $k$, by which it may be hung up.

It is evident that slight changes might be made in the details of construction of my invention without departing from the spirit thereof or limiting its scope. Hence I do not wish to limit myself to the precise details of construction herein described; but, Having fully described my invention, what I claim as new, and desire to secure by Letters Patent, is—

1. A map-holder consisting of two slotted tubes, one within the other, a shaft in the inner tube, and means for removably connecting the parts together, substantially as set forth.

2. A map-holder consisting of two slotted tubes, one revolubly located in the other, a revoluble shaft in the inner tube, and a screw for removably connecting said parts together, substantially as set forth.

3. A map-holder composed of two slotted tubes, one within the other, and a roll contained within the inner tube and adapted to be drawn through the slots, substantially as set forth.

4. In a map-holder, the combination, with an outer tube, of an inner tube revolubly located in the outer tube, both of said tubes having elongated openings, a collar on the inner tube by means of which to rotate it, a shaft within the inner tube for carrying a map or chart, and a disk on one end of said shaft whereby to rotate it, substantially as set forth.

5. In a map-holder, the combination, with an outer tube having a flanged disk at one end and a perforation through said disk and flange, of an inner tube, both tubes being provided with elongated slots, a shaft in the inner tube and bearing at one end in the perforation in the flanged disk, a disk at the other end of the shaft, and an annular flange or collar of said disk to enter the inner tube and form a bearing for said shaft, substantially as set forth.

In testimony whereof I have signed this specification in the presence of two subscribing witnesses.

WILLIAM F. SEMPLE.

Witnesses:
DAN M. PARK,
J. F. MYERS.